D. WHITAKER AND H. C. BAXTER.
TUNNELING MACHINE.
APPLICATION FILED JUNE 28, 1920.

1,403,530.

Patented Jan. 17, 1922.
2 SHEETS—SHEET 2.

UNITED STATES PATENT OFFICE.

DOUGLAS WHITAKER AND HAROLD COLE BAXTER, OF LEICESTER, ENGLAND.

TUNNELING MACHINE.

1,403,530.  Specification of Letters Patent.  Patented Jan. 17, 1922.

Application filed June 28, 1920. Serial No. 392,482.

*To all whom it may concern:*

Be it known that we, DOUGLAS WHITAKER and HAROLD COLE BAXTER, subjects of the King of Great Britain, residing at Leicester, in the county of Leicester, England, have invented certain new and useful Improvements in or Relating to Tunneling Machines, (for which I have filed an application in England Oct. 6, 1917, Patent No. 119,112,) of which the following is a specification, reference being had therein to the accompanying drawing.

This invention relates to tunneling machines and more especially, though not necessarily exclusively, shield tunneling machines, and has for its object the provision of improved means for the removal of the excavated material.

The invention consists of a tunneling machine having in combination, a rotating drum or centre piece provided on its front face with an inner series of cutters and buckets and on its circumference with an outer series of cutters and buckets, a semicircular hopper situated immediately behind the rotating drum or centre piece and being open at the front to the same to receive the excavated material from the inner series of buckets through openings in the drum, the buckets of the outer series projecting rearwardly from the drum over the hopper and being open on the side adjacent said hopper the bottom of the hopper forming a closure for the said open sides of the buckets during the time the latter are travelling round past the hopper, a trough extending rearwardly from the hopper, and a rotary worm conveyor to move the material along the trough, the front end of said conveyor extending into the hopper.

To enable the invention to be clearly understood a practical embodiment of the same is illustrated by way of example in the accompanying drawing to which reference will be made in the following further description.

In the drawing referred to:—

Figure 2:
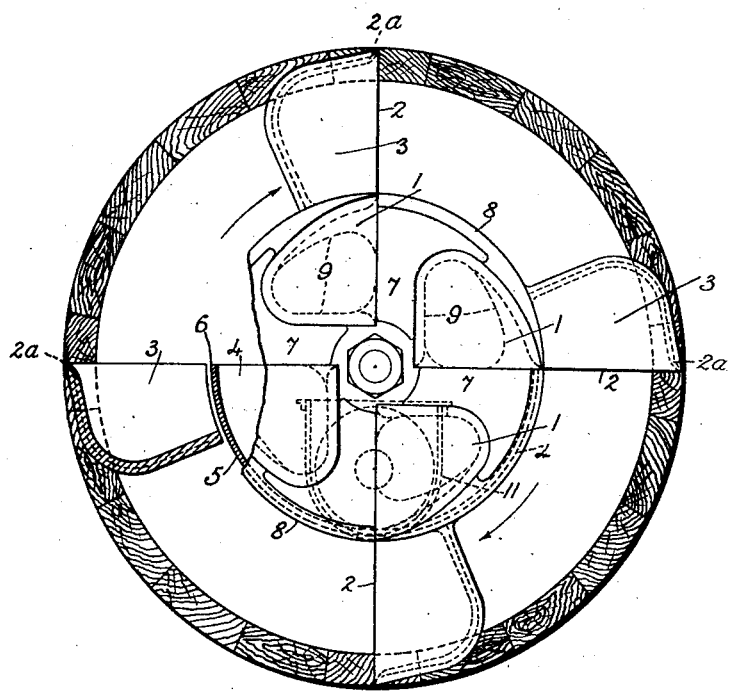
Figure 2 is a front elevation of the machine partly in section.

In the specific arrangement shown in the drawing, the rotary cutter head of the machine is equipped with a central or inner leading series of cutters 1 and an outer series of cutters 2. Combined with the cutters of the outer series are buckets 3 which receive the material excavated by said cutters. A semicircular hopper 4 is situated behind and close up to the inner series of cutters, the buckets of the outer series being arranged to move round in close proximity to the bottom 5 of the hopper. On the side nearest the hopper the buckets are open as will be seen by the sectional part of Figure 2, and the semicircular bottom 5 of the hopper forms a closure for said open sides of the buckets during the time the latter are travelling round past the hopper. The contents of the buckets are retained therein by the adjacent bottom 5 of the hopper but upon the buckets passing above the upper edge 6 of the hopper and reaching a position where sufficient angle is obtained, the contents slide out of the buckets into the hopper.

The semicircular hopper 4 is of a radius equal to or somewhat greater than that of the inner series of cutters 1 so that it can receive direct the material excavated by the said inner series of cutters.

The cutters of the outer series may be formed or carried on the buckets 3 and comprise face cutters 2 and circumferential cutters or scoops $2^a$. The cutters 1 of the inner series are in the form of face cutters mainly although they may be shaped so as to partly act as circumferential cutters as well. These inner cutters are formed like pockets or buckets on radial arms 7 of a drum or centre piece 8 to or upon the circumferential rim of which the buckets 3 are attached or formed. The pocket like cutters 1 of the inner series discharge the material they excavate through openings 9 into the hopper 4 these openings being formed in the centre piece 8 for this purpose.

The centre piece or drum 8 may also carry segmental shield plates (not shown) disposed intermediately of the buckets 3 and adapted to move round in advance of the cutters to prevent collapse of the face of the bore.

Figure 1:
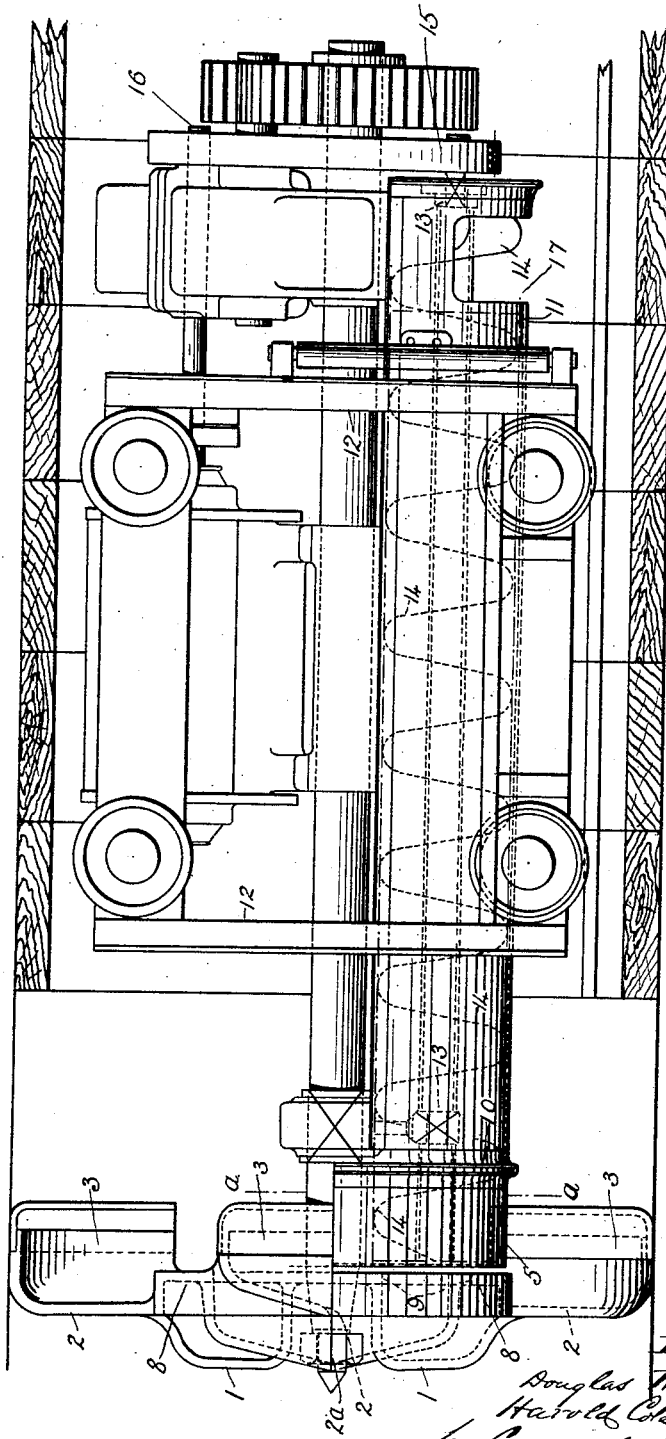
Figure 1 is a side elevation of a tunneling machine provided with means for mechanically collecting and removing the excavated material.
Figure 3:
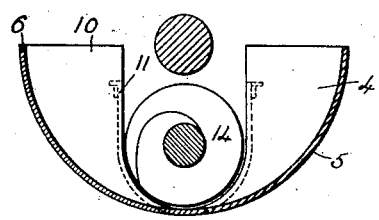
Figure 3 is a transverse section of the hopper on the line *a*—*a* of Figure 1.

The hopper 4 is open at the front side to the rear of the cutter head and closed at the back 10 (Figure 3) except where the conveyor trough 11 enters. This trough is suitably supported by the machine framework 12 and furnished with bearings 13 carrying the rotary worm conveyor 14 which is driven by convenient means, such as chain gear 15, from the main drive 16. The bottom of the trough is level with the bottom of the hopper the front end of the worm conveyor extending into the hopper, as shown in Figure 1 to remove the collected material therefrom.

By means of the hereindescribed cutter head, hopper and conveyor, the material as it is excavated, is mechanically collected and conveyed to the rear of the machine and may be discharged through an opening 17 in the through 11.

What we claim then is:—

1. A tunneling machine having, in combination, a rotating drum, an inner series of cutters and buckets on the front face thereof, an outer series of cutters and buckets on the circumference of said drum, a semicircular hopper situated immediately behind the rotating drum and open at the front to the same to receive the excavated material from the inner series of buckets through openings in the drum, the buckets of the outer series projecting rearwardly from the drum over the hopper and being open on the side adjacent thereto the bottom of the hopper forming a closure for the said open sides of the buckets during the time the latter are travelling round past the hopper, a trough extending rearwardly from the hopper, and a rotary worm conveyor to move the material along the trough, the front end of said conveyor extending into the hopper, substantially as described.

2. A tunneling machine having, in combination, a frame adapted to travel along the bore, a rotary cutter shaft carried by the frame, means for driving said shaft, a drum fixed upon the front end of said shaft, an inner series of cutters and buckets on the front face of said drum, an outer series of cutters and buckets on the circumference of said drum, a semicircular hopper situated immediately behind the rotating drum and open at the front to the same to receive the excavated material from the inner series of buckets through openings in the drum, the buckets of the outer series projecting rearwardly from the drum over the hopper and being open on the side adjacent thereto the bottom of the hopper forming a closure for the said open sides of the buckets during the time the latter are travelling round past the hopper, a trough in open communication with the extending rearwardly from the hopper and carried by the frame, said hopper being carried by the trough and the bottom thereof being level with the bottom of said trough, a rotary worm conveyor to move the material along the trough and discharge same through an opening formed in the bottom thereof at the rear end, the front end of said conveyor extending into the hopper, and means to drive the conveyor, substantially as described.

In testimony whereof we affix our signatures in presence of two witnesses.

DOUGLAS WHITAKER.
HAROLD COLE BAXTER.

Witnesses:
N. W. C. TAYLOR,
GEORGE LESTER.